(12) United States Patent
Yao (10) Patent No.: US 11,849,006 B2
(45) Date of Patent: Dec. 19, 2023

(54) METHOD FOR REPORTING ASYNCHRONOUS DATA, ELECTRONIC DEVICE AND STORAGE MEDIUM

(71) Applicant: APOLLO INTELLIGENT CONNECTIVITY (BEIJING) TECHNOLOGY CO., LTD., Beijing (CN)

(72) Inventor: Qianpeng Yao, Beijing (CN)

(73) Assignee: APOLLO INTELLIGENT CONNECTIVITY (BEIJING) TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/804,925

(22) Filed: Jun. 1, 2022

(65) Prior Publication Data
US 2022/0294874 A1    Sep. 15, 2022

(30) Foreign Application Priority Data
Jun. 3, 2021   (CN) .......................... 202110620337.2

(51) Int. Cl.
  *H04L 67/60*    (2022.01)
  *H04L 67/02*    (2022.01)

(52) U.S. Cl.
  CPC .............. *H04L 67/60* (2022.05); *H04L 67/02* (2013.01)

(58) Field of Classification Search
  CPC .................................. H04L 67/60; H04L 67/02
  See application file for complete search history.

(56) References Cited

U.S. PATENT DOCUMENTS

| 8,375,019 B2 * | 2/2013 | Salinas | ................... G06F 16/70 |
| | | | 707/706 |
| 9,438,448 B2 * | 9/2016 | Tripathi | ................... H04L 51/04 |
| (Continued) | | | |

FOREIGN PATENT DOCUMENTS

| CN | 105450724 A | 3/2016 |
| CN | 106487596 A | 3/2017 |
| (Continued) | | |

OTHER PUBLICATIONS

Aley, R . . . (2016). PHP beyond the web. 10.1007/978-1-4842-2481-6, pp. 1-206 (Year: 2016).*

(Continued)

*Primary Examiner* — Chirag R Patel
(74) *Attorney, Agent, or Firm* — Osha Bergman Watanabe & Burton LLP (57) ABSTRACT

A method for reporting asynchronous data and an electronic device are provided. The method includes: in response to satisfying a data reporting condition, calling a connection opening function for opening a Socket connection of a network resource, and generating a HypertextTransferProtocol (HTTP) request by the connection opening function, in which the HTTP request at least includes address information of a server and data to be reported; calling a writing function to write the HTTP request into an exclusive resource corresponding to the connection opening function, and sending the HTTP request to the server by the exclusive resource; and in response to that sending the HTTP request by the exclusive resource is completed, closing the exclusive resource by calling a close function, so as to stop receiving a feedback message of the HTTP request sent by the server, and terminate data reporting.

17 Claims, 4 Drawing Sheets

(56) References Cited

U.S. PATENT DOCUMENTS

| | | | |
|---|---|---|---|
| 9,800,646 B1 | 10/2017 | Stamatakis et al. | |
| 2004/0139432 A1* | 7/2004 | Bender | G06F 9/485 718/100 |
| 2010/0211626 A1* | 8/2010 | Li | H04L 67/14 709/227 |
| 2020/0259927 A1* | 8/2020 | Shribman | H04L 67/567 |
| 2021/0035133 A1 | 2/2021 | Borland et al. | |
| 2021/0241357 A1* | 8/2021 | Fursman | G06F 16/258 |

FOREIGN PATENT DOCUMENTS

| | | |
|---|---|---|
| CN | 106506644 A | 3/2017 |
| CN | 107508759 A | 12/2017 |
| CN | 110933171 A | 3/2020 |
| CN | 111949387 A | 11/2020 |
| JP | 2005078484 A | 3/2005 |
| WO | 2010110245 A1 | 9/2010 |

OTHER PUBLICATIONS

Extended European Search Report issued in corresponding EP Application No. 22176881.5 dated Jul. 21, 2022 (11 pages).

Anonymous: "Socket Programming in PHP—CodeProject" May 6, 2021 (May 6, 2021), pp. 1-6, XP055940839, Retrieved from the Internet: URL:https://web . archive.org/web/2021050615 3536/ https://www.codeproject.com/Tips/418814/Socket-Programming-in-PHP [retrieved on Jul. 11, 2022] "PHP Client" and its complete code "client.php"; p. 3-p. 4 (6 pages).

Office Action issued in corresponding CN Application No. 202110620337.2 with English translation dated Jun. 28, 2023 (21 pages).

Office Action issued in corresponding JP Application No. 2022-057196 with English translation dated Mar. 22, 2023 (8 pages).

Yuezhi, Iwaki How to protect the home Raspberry Pi server from illegal access CQ Publication Incorporated Company No. 3 43rd Volume on Mar. 1, 2017, pp. 117-122 with English translation (12 pages).

* cited by examiner

METHOD FOR REPORTING ASYNCHRONOUS DATA, ELECTRONIC DEVICE AND STORAGE MEDIUM

CROSS-REFERENCE TO RELATED APPLICATIONS

This application claims the benefit of priority to Chinese Application No. 202110620337.2, filed on Jun. 3, 2021, the contents of which are incorporated herein by reference in their entirety.

TECHNICAL FIELD

The disclosure relates to a field of computer technology, in particular to the technical fields of big data, intelligent search, information flow and cloud platform.

BACKGROUND

With the continuous maturity of Internet technology, the Internet has increasingly become an important platform for information acquirement, communication, entertainment and business. A large amount of data such as information and logs can be generated during usage of the Internet. Such data has huge commercial and social value and needs to be reported.

Data reporting refers to aggregation of user behavior data, application running logs or other valuable data generated by servers or clients to a data center. In the era of the Internet and mobile Internet, the value of data is increasing, data means everything. Therefore, how to aggregate and report data is particularly critical.

SUMMARY

The disclosure provides a method for reporting asynchronous data, an electronic device and a storage medium.

According to a first aspect, the disclosure provides a method for reporting asynchronous data. The method includes: in response to satisfying a data reporting condition, calling a connection opening function for opening a Socket connection of a network resource, and generating a HypertextTransferProtocol (HTTP) request by the connection opening function, in which the HTTP request at least includes address information of a server and data to be reported; writing the HTTP request into an exclusive resource corresponding to the connection opening function by calling a writing function, and sending the HTTP request to the server by the exclusive resource; and in response to that sending the HTTP request by the exclusive resource is completed, closing the exclusive resource by calling a close function, so as to stop receiving a feedback message of the HTTP request sent by the server, and terminate data reporting.

According to a second aspect, the disclosure provides an electronic device. The electronic device includes: at least one processor and a memory communicatively coupled to the at least one processor. The memory stores instructions executable by the at least one processor, and when the instructions are executed by the at least one processor, the at least one processor is enabled to implement the method for reporting asynchronous data according to the first aspect.

According to a third aspect, the disclosure provides a non-transitory computer-readable storage medium storing computer instructions. The computer instructions are configured to cause a computer to implement the method for reporting asynchronous data according to the first aspect.

It should be understood that the content described in this section is not intended to identify the key or important features of the embodiments of the disclosure, nor is it intended to limit the scope of the disclosure. Additional features of the disclosure will be easily understood through the following description.

BRIEF DESCRIPTION OF THE DRAWINGS

The drawings are used to better understand the solution and do not constitute a limitation of the disclosure, in which.

DETAILED DESCRIPTION

The exemplary embodiments of the disclosure are described below in combination with the accompanying drawings, which include various details of the embodiments of the disclosure to aid in understanding, and should be considered merely exemplary. Therefore, those skilled in the art should know that various changes and modifications can be made to the embodiments described herein without departing from the scope and spirit of the disclosure. For the sake of clarity and brevity, descriptions of well-known features and structures have been omitted from the following description.

A method for reporting asynchronous data and an apparatus for reporting asynchronous data, an electronic device and a storage medium are described below with reference to the accompanying drawings.

Internet technology refers to an information technology developed and established on the basis of computer technology. Internet technology enables different devices to be connected to each other through the wide area network of the computer network, accelerates the transmission speed of information, broadens the acquisition channels of information, promotes the development of various software applications, and changes the way people live and learn.

The content of computer technology is very broad, and can be roughly divided into several aspects such as computer system technology, computer device technology, computer component technology and computer assembly technology. Computer technology includes: basic principles of computing methods and computing unit design, instruction system, central processing unit (CPU) design, pipeline principle and its application in CPU design, storage system, bus and input and output.

Big data, a term in the IT industry, refers to a collection of data that cannot be captured, managed and processed by conventional software tools within a certain time period, which is massive, high-growth-rate and diverse information assets requiring new processing modes to have strong decision-making power, insight, and process optimization capabilities. In "The Age of Big Data" written by Viktor Mayer-Schönberger and Kenneth Cukier, big data refers to the use of all data for analysis and processing without the shortcut of random analysis (sampling survey). The big data has 5V characteristics (proposed by IBM) including: Volume (a lot), Velocity (high speed), Variety, Value (low value density), and Veracity (authenticity).

Information flow means that people use various ways to communicate information, from face-to-face direct conversation to usage of various modern transmission media, including channels and processes such as information collection, transmission, processing, storage, retrieval, and analysis. There are broad and narrow senses. In a broad sense, the information flow refers to a group of information in the process of moving in the same direction in space and time, and the group of information has a common information source and information receiver. That is, a collection of all information transmitted from one information source to another unit. In a narrow sense, the information flow refers to transmission of information, which is carried out through certain channels according to certain requirements under conditions of modern information technology research, development and application.

Cloud computing platform, also known as cloud platform, refers to services providing computing, network and storage capabilities based on hardware resources and software resources. Cloud computing platforms can be divided into three categories: storage-type cloud platforms mainly for data storage, computing-type cloud platforms mainly for data processing, and comprehensive cloud computing platforms for both data computing and data storage.

Intelligent retrieval is based on the relevance of documents and search terms, comprehensively examines the importance of documents and other indicators, and sorts the retrieval results, in order to achieve high retrieval efficiency. Relevance and importance are considered in the ranking of results of intelligent retrieval. Relevance adopts weighted mix index of each field, which may make relevance analysis more accurate. Importance refers to the evaluation of document quality through authoritative analysis of document sources and citation relationship analysis. Such results are ranked more accurately, and the documents most relevant to the user's wishes can be ranked first, thereby improving the retrieval efficiency.

The method for reporting asynchronous data according to the embodiment of the disclosure may be performed by an electronic device. The electronic device may be a personal computer (PC), a tablet computer, or a handheld computer, which is not limited here.

In the embodiment of the disclosure, the electronic device may be provided with a processing component, a storage component and a driving component. Alternatively, the driving component and the processing component may be integrated, the storage component may store an operating system, an application program or other program modules. The processing component implements the method for reporting asynchronous data according to the embodiments of the disclosure by executing the application program stored in the storage component.

Figure 1:
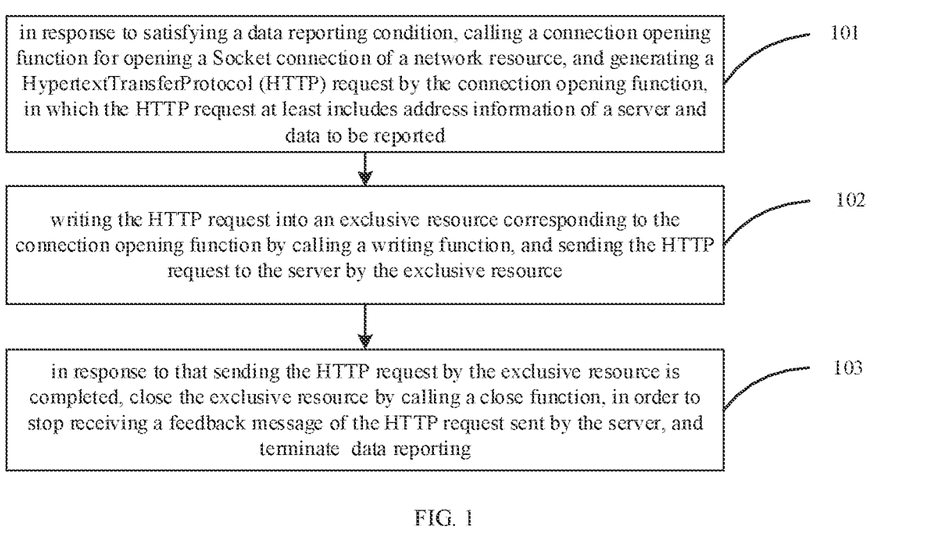
FIG. 1 is a flowchart of a method for reporting asynchronous data according to an embodiment of the disclosure.

FIG. 1 is a flowchart of a method for reporting asynchronous data according to an embodiment of the disclosure.

The method for reporting asynchronous data according to the embodiment of the disclosure may also be performed by an apparatus for reporting asynchronous data according to the embodiment of the disclosure. The apparatus may be configured in an electronic device. In the embodiment of the disclosure, during implement of an application or service, a data reporting condition is detected, and when the data reporting condition is satisfied, a special function is used to implement a data reporting process of asynchronous data, and after the asynchronous data is reported, the data reporting process can be completed without waiting for a feedback message sent by the server, and the subsequent process can be directly executed, which saves a processing time of the overall process and improves an efficiency of data reporting.

In a possible situation, the method for reporting asynchronous data in the embodiment of the disclosure may also be executed on a client terminal. The client terminal may be a mobile phone terminal, and the method for reporting asynchronous data may be executed on the mobile phone terminal.

As shown in FIG. 1, the method for reporting asynchronous data can include the following.

In block 101, in response to satisfying a data reporting condition, a connection opening function for opening a Socket connection of a network resource is called, and a HypertextTransferProtocol (HTTP) request is generated by the connection opening function, in which the HTTP request at least includes address information of a server and data to be reported.

It should be noted that an execution subject in this embodiment is a client, that is, a terminal device that needs to report data.

It should be noted that, the server described in this embodiment may be a server corresponding to a client, or may be a storage area network dedicated for storing data, which is not limited here.

It should be noted that the address information in this embodiment can be the Uniform Resource Locator (URL) of the server. For example, when a user uses the client of a shopping software to shop, the address information for the data reporting is the URL corresponding to the shopping software.

It should be noted that the data to be reported described in this embodiment may be user behavior data, application runtime logs, or other valuable data generated by a server application or a client application.

Alternatively, in scenarios such as website servers, Application Programming Interfaces (APIs), and microservices developed based on a PreHypertextPreprocessor (PHP), the connection opening function configured to open the Socket connection of the network resource may be the fsockopen function.

It should be noted that the Internet architecture is composed of a Web server, a client and an HTTP protocol. The reporting of data such as information logs generated by the user using the Internet and a content of a request returned by the Web server to the client need to use the HTTP protocol for interaction, in order to achieve communication and interconnection. Therefore, in order to report data to the server, the HTTP request needs to be generated by the connection opening function, to realize remote reporting to the server.

In an embodiment of the disclosure, there may be multiple data reporting conditions, which will be described one by one below.

For example, the data reporting condition may be a preset timing reporting time, and the client determines that the data reporting condition is satisfied in response to a system time reaching the preset timing reporting time. For example, the client is provided with a timer, the timer performs timing periodically, and when the time reaches the preset time, a data reporting event is triggered.

For another example, the client detects a target event during execution of a business logic, and determines that the data reporting condition is satisfied in response to the target event is detected.

Further, during the execution of the business logic, placing an order, browsing pages or other interactive events may exist, a trigger button can be set for these events, and when these events are operated, the data reporting event is triggered.

For another example, the client determines that the data reporting condition is satisfied in response to the system time reaching the preset timing reporting time and the target event being detected during the execution of the business logic.

In the embodiment of the disclosure, there may be various the data reporting conditions. The conditions may include the system time reaching the preset timing reporting time, or detecting the target event, or a combination of several conditions, which is not limited here and is set according to the specific situation. Therefore, it can ensure that the data reporting can be adapted to different scenarios and different execution logics, and more reliable for development and application in a production environment.

In block 102, the HTTP request is written into an exclusive resource corresponding to the connection opening function by calling a writing function, and the HTTP request is sent to the server by the exclusive resource. It should be noted that the exclusive resource can be a separate channel or thread.

In the embodiment of the disclosure, after the client triggers the data reporting condition, the exclusive resource is initialized and configured by the fsockopen function, and then the writing function is called, for example, the fwrite function, to write the HTTP request into the matching exclusive resource and reports the HTTP request to the corresponding URL through exclusive resources.

In block 103, in response to that sending the HTTP request by the exclusive resource is completed, the exclusive resource is closed by calling a close function, in order to stop receiving a feedback message of the HTTP request sent by the server, and terminate data reporting.

A process of the exclusive resource sending the HTTP request is monitored. When monitoring that sending the HTTP request is completed, the close function is called, such as the fclose function, to close the exclusive resource. Alternatively, an end field can be carried in the HTTP request, and when the end field is sent, it is determined that sending the HTTP request is completed. After the exclusive resource is closed, the connection between the exclusive resource and the server is disconnected, such that the exclusive resource cannot receive the feedback message of the HTTP request sent by the server. That is, the client will not wait until the feedback message is received to terminate the data reporting process. That is, after the exclusive resource is closed by the close function, the client directly terminates the data reporting process.

In the embodiment of the disclosure, after the client satisfies the data reporting condition, the HTTP request is generated by calling the connection opening function for opening the Socket connection of the network resource. The HTTP request is written into the exclusive resource corresponding to the connection opening function by calling the writing function, and reported to the server corresponding to the URL through the exclusive resource. After sending the HTTP request through the exclusive resource is completed, the close function is called to directly close the exclusive resource, so as to terminate the data reporting process, without waiting for the feedback message from the server. Therefore, it can be realized that when the client reports data, it does not need to wait for the server's feedback on the HTTP request, and the subsequent process can be executed directly, which saves the processing time of the overall process and improves the efficiency of data reporting.

It should be noted that, generally, after the server receives the HTTP request sent by the client, the client needs to remain in a connected state to continuously process the HTTP request. If the client is disconnected or interrupted, the server will detect that the terminal device is disconnected or interrupted, in this case, the server will no longer perform subsequent process on the HTTP request. In order to realize that the server can still process the HTTP request after the exclusive resource is closed in the embodiment of the disclosure, it is necessary to configure a configuration item for the server information to instruct the server to continue processing the HTTP request when detecting that the client is interrupted. For example, the configuration item of a web server (nginx) is modified, so that when nginx detects that the HTTP request is closed, it will not stop processing the HTTP request. In this way, it can prevent the server from processing the HTTP request when detecting that the exclusive resource is closed, so that the data reporting function is more stable and reliable.

Figure 2:
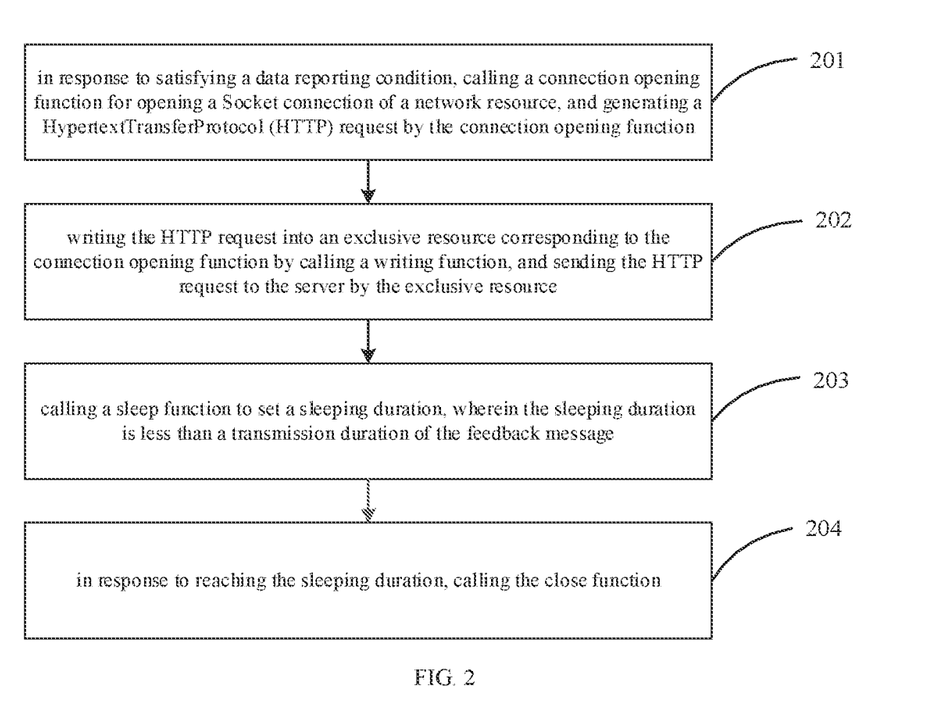
FIG. 2 is a flowchart of a method for reporting asynchronous data according to an embodiment of the disclosure.

In order to clearly illustrate the previous embodiments, in an embodiment of the disclosure, as shown in FIG. 2, the method may include the following.

In block 201, in response to satisfying a data reporting condition, a connection opening function for opening a Socket connection of a network resource is called, and a HypertextTransferProtocol (HTTP) request is generated by the connection opening function.

In block 202, the HTTP request is written into an exclusive resource corresponding to the connection opening function by calling a writing function, and the HTTP request is sent to the server by the exclusive resource. For details, reference can be made to the relevant content of the previous embodiments.

In block 203, a sleep function is called to set a sleeping duration, and the sleeping duration is less than a transmission duration of a feedback message.

In the embodiment of the disclosure, after the writing function writes the HTTP request into a matching exclusive resource, the sleep function, such as the usleep function, is called to make the program wait for the sleeping duration set by the sleep function.

It should be noted that the sleeping duration set in the sleep function is much shorter than the transmission duration of the feedback message. For example, the time of making a feedback to an HTTP request is 100 milliseconds, the sleeping duration set by the sleep function is 1 millisecond, and the sleeping duration set by the sleep function is much shorter than the feedback duration of the HTTP request.

In block 204, in response to reaching the sleeping duration, a close function is called.

In the embodiment of the disclosure, when the writing function writes the HTTP request into the matching exclusive resource, the sleep function is called to set the sleeping duration, the sleeping duration is less than the transmission duration of the feedback message. In response to reaching the sleeping duration, the close function is called by the client to close the exclusive resource. Therefore, the server can detect that the exclusive resource is in a dormant state instead of being closed, and maintain a relatively short period of time to ensure that the HTTP request can be smoothly sent to the server, so that the data reporting function is more stable and reliable.

Figure 3:
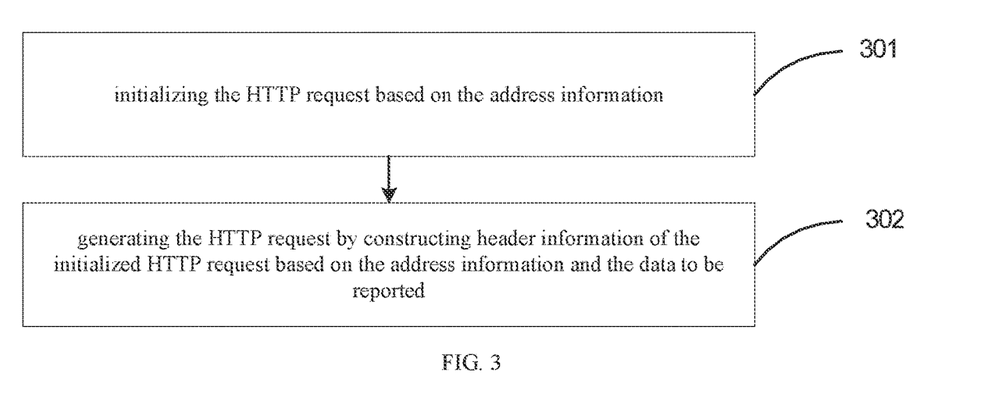
FIG. 3 is a flowchart of a method for reporting asynchronous data according to an embodiment of the disclosure.

On the basis of the above-mentioned embodiments, in an embodiment of the disclosure, as shown in FIG. 3, the HTTP request is generated by the connection opening function as follows.

In block 301, the HTTP request is initialized based on the address information.

In the embodiment of the disclosure, the initialization of the HTTP request may be that the client calls the connection opening function (Fsockopen function) to write the address information into the HTTP request. It should be noted that the address information described above matches the URL.

In block 302, the HTTP request is generated by constructing header information of the initialized HTTP request based on the address information and the data to be reported.

It should be noted that the header information described in this embodiment may be actual reported data of the HTTP request, a data length, a network node (host) and other information.

In the embodiment of the disclosure, the client initializes the HTTP request based on the address information, and then constructs the header of the initialized HTTP request to generate the HTTP request. Therefore, the address information in the HTTP request is matched with the URL, so that the data can be reported to the URL more accurately.

Figure 4:
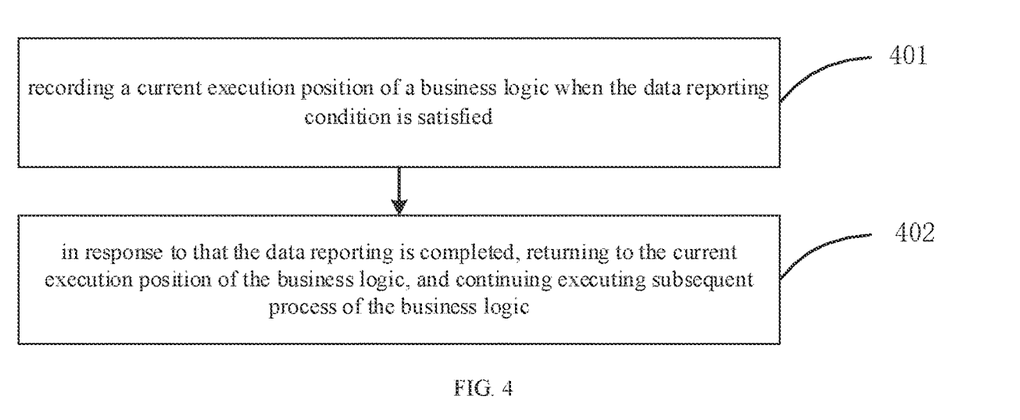
FIG. 4 is a flowchart of a method for reporting asynchronous data according to an embodiment of the disclosure.

On the basis of the above embodiments, in order to realize the continuous execution of a business logic, in an embodiment of the disclosure, as shown in FIG. 4, before calling the connection opening function for opening the Socket connection of the network resource, the method further includes the following.

In block 401, a current execution position of a business logic when the data reporting condition is satisfied is recorded. It should be noted that the business logic is a main execution logic of a program, such as user login, shopping and ordering, obtaining a list of items or the list. Subsequent data reporting is executed based on the main execution logic.

In the embodiment of the disclosure, the business logic may be recorded by a client program. The recorded business logic may be stored in a certain segment of the Socket connection opened by the connection opening function, which is not limited herein.

In block 402, in response to that the data reporting is completed, it is returned to the current execution position of the business logic, and executing subsequent process of the business logic is continued.

In the embodiment of the disclosure, the current execution position of the business logic at the moment when the data reporting condition is satisfied is recorded, in response to that the data reporting process is completed, the client returns to the current execution position of the business logic, and continues to execute the subsequent process of the business logic. Therefore, after the data reporting process is completed, the main execution logic will continue to execute at the execution position without waiting for a result of the data report, which will not affect the main execution logic, nor increase the time-consuming of the main execution logic.

Figure 5:
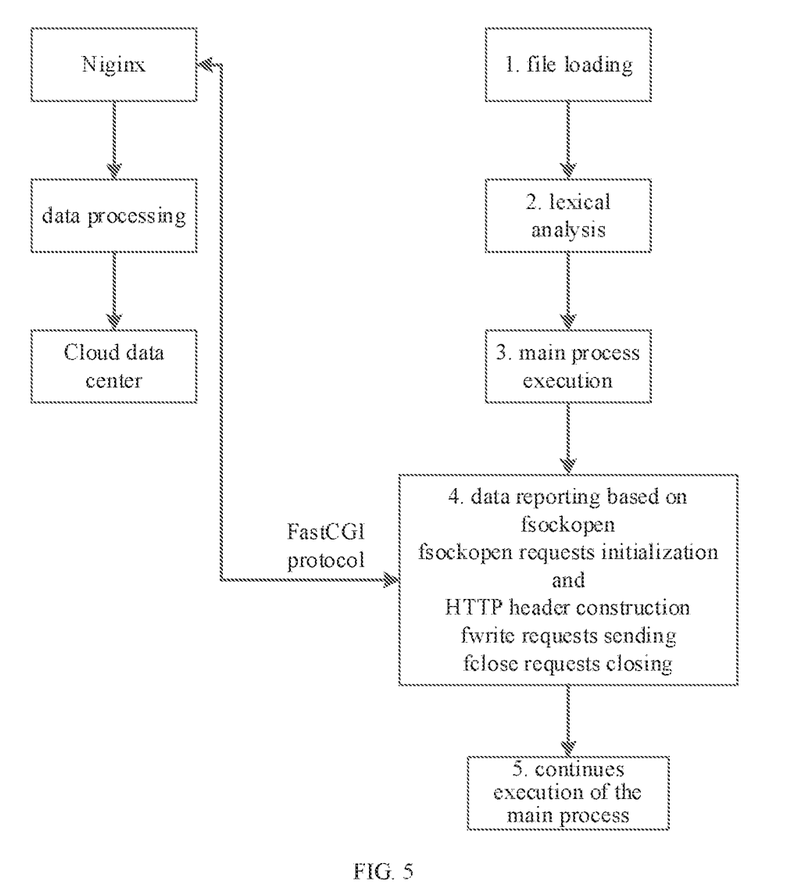
FIG. 5 is a flowchart of a method for reporting asynchronous data according to an embodiment of the disclosure.

FIG. 5 is a flowchart of a method for reporting asynchronous data according to an embodiment of the disclosure. As shown in FIG. 5, in the first step, a client receives a service request, and loads a configuration file based on the service request, the configuration file includes a main process and a data reporting process corresponding to a business logic of the service request corresponding to the service. In the second step, lexical analysis is performed on the configuration file, the main process corresponding to the service is found, and then the third step is executed to perform the main process. During the main process, it is detected whether the data reporting condition is satisfied, the current execution position of the main process is recorded when satisfying the data reporting condition, and the data reporting process is executed in the fourth step. In the fourth step, the HTTP request is initialized through the fsockopen function, the header information of the HTTP is spliced in the program, and then the fwrite function is called to send the HTTP request to the Nginx. After sending the HTTP request by the fwrite function is completed, the fclose function is immediately called to close the HTTP request created above, the main process is continually executed by returning to the recorded execution position of the main process. Correspondingly, after Nginx obtains the HTTP request, since the request carries the data uploaded by the client, it can extract and preprocess the data uploaded by the client, and then store the data in the cloud data center. It should be noted that the communication between the server and the client is performed through the Fast Common Gateway Interface Protocol (fastCGI protocol). Alternatively, the data reporting process can be an encapsulation program. It should be noted that in this example, the configuration information of the Nginx needs to be modified first, so that the Nginx does not give up processing the HTTP request even if the client is actively disconnected.

Figure 6:
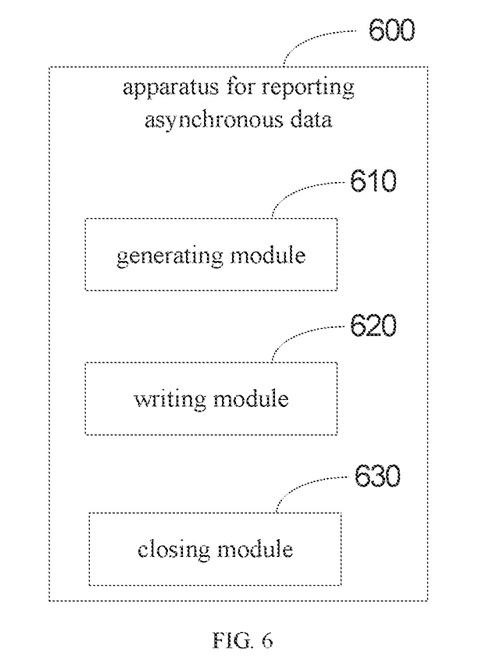
FIG. 6 is a block diagram of an apparatus for reporting asynchronous data according to an embodiment of the disclosure.

FIG. 6 is a block diagram of an apparatus for reporting asynchronous data according to an embodiment of the disclosure.

The disclosure provides an apparatus for reporting asynchronous data according to an embodiment. The apparatus may be configured in an electronic device. In the embodiment of the disclosure, during implement of an application or service, a data reporting condition is detected, and in response to that the data reporting condition is satisfied, a special function is used to implement a data reporting process of asynchronous data, and after the data is reported, the data reporting process can be completed without waiting for a feedback message sent by the server, and subsequent processes can be directly executed, which saves a processing time of the overall process and improves an efficiency of data reporting.

As shown in FIG. 6, the apparatus 600 for reporting asynchronous data may include: a generating module 610, a writing module 620 and a closing module 630.

The generating module 610 is configured to, in response to satisfying a data reporting condition, call a connection opening function for opening a Socket connection of a network resource, and generate a HTTP request by the connection opening function. The HTTP request at least includes address information of a server and data to be reported. It should be noted that an execution subject in this embodiment is a client, that is, a terminal device that needs to report data.

In an embodiment of the disclosure, the generating module 610 generates the HTTP request by the connection opening function by: initializing the HTTP request based on the address information; and generating the HTTP request by constructing header information of the initialized HTTP request based on the address information and the data to be reported.

In another embodiment of the disclosure, the generating module 610 is further configured to: detect whether the data reporting condition is satisfied; record an execution position of a business logic when the data reporting condition is satisfied; and in response to that the data reporting is completed, return to the execution position of the business logic, and continue executing subsequent process of the business logic.

The writing module 620 is configured to write the HTTP request into an exclusive resource corresponding to the connection opening function by calling a writing function, and send the HTTP request to the server by the exclusive resource. It should be noted that the exclusive resource can be a dedicated channel or thread.

The closing module 630 is configured to, in response to that sending the HTTP request by the exclusive resource is completed, close the exclusive resource by calling a close function, in order to stop receiving a feedback message of the HTTP request sent by the server, and terminate data reporting.

In another embodiment of the disclosure, the closing module 630 is further configured to: call a sleep function to set a sleeping duration, in which the sleeping duration is less than a transmission duration of the feedback message; and in response to reaching the sleeping duration, call the close function.

In this embodiment of the disclosure, after the client satisfies the data reporting condition, the generating module 610 calls a connection opening function for opening a Socket connection of a network resource, and generates an HTTP request. The writing module 620 writes the HTTP request into an exclusive resource by calling a writing function, and sends the HTTP request to the server corresponding to the URL by the exclusive resource. After sending the HTTP request by the exclusive resource is completed, the closing module 630 calls the close function to directly close the exclusive resource so as to terminate the data reporting, without waiting for a feedback message from the server. Therefore, when reporting data, the client can directly execute the subsequent process without waiting for the server's feedback on the HTTP request, which saves the processing time of the overall process and improves the efficiency of data reporting.

According to the embodiments of the disclosure, the disclosure also provides an electronic device, a readable storage medium and a computer program product.

Figure 7:
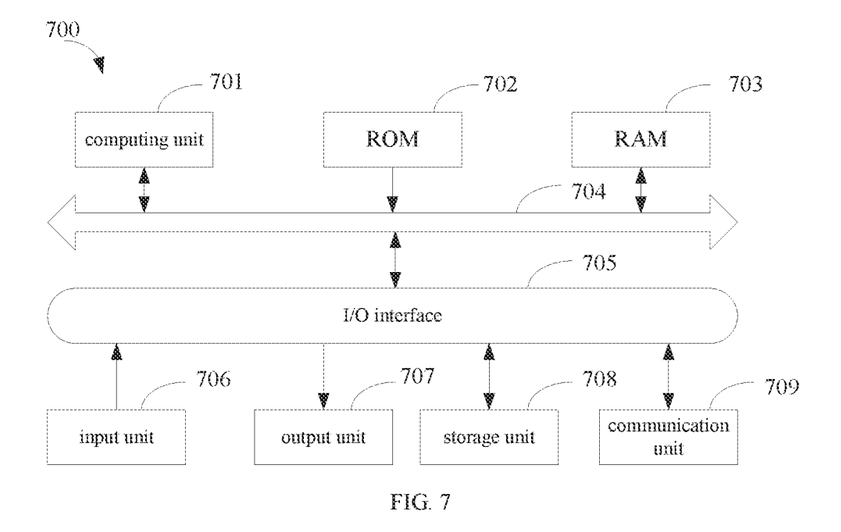
FIG. 7 is a block diagram of an electronic device used to implement the method for reporting asynchronous data according to an embodiment of the disclosure.

FIG. 7 is a block diagram of an electronic device 700 according to an embodiment of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 7, the device 700 includes a computing unit 701 performing various appropriate actions and processes based on computer programs stored in a read-only memory (ROM) 702 or computer programs loaded from a storage unit 705 to a random access memory (RAM) 703. In the RAM 703, various programs and data required for the operation of the device 700 are stored. The computing unit 701, the ROM 702, and the RAM 703 are connected to each other through a bus 704. An input/output (I/O) interface 705 is also connected to the bus 704.

Components in the device 700 are connected to the I/O interface 705, including: an inputting unit 706, such as a keyboard, a mouse; an outputting unit 707, such as various types of displays, speakers; the storage unit 705, such as a disk, an optical disk; and a communication unit 709, such as network cards, modems, and wireless communication transceivers. The communication unit 709 allows the device 700 to exchange information/data with other devices through a computer network such as the Internet and/or various telecommunication networks.

The computing unit 701 may be various general-purpose and/or dedicated processing components with processing and computing capabilities. Some examples of computing unit 701 include, but are not limited to, a central processing unit (CPU), a graphics processing unit (GPU), various dedicated AI computing chips, various computing units that run machine learning model algorithms, and a digital signal processor (DSP), and any appropriate processor, controller and microcontroller. The computing unit 701 executes the various methods and processes described above, such as the method for reporting asynchronous data. For example, in some embodiments, the method may be implemented as a computer software program, which is tangibly contained in a machine-readable medium, such as the storage unit 705. In some embodiments, part or all of the computer program may be loaded and/or installed on the device 700 via the ROM 702 and/or the communication unit 709. When the computer program is loaded on the RAM 703 and executed by the computing unit 701, one or more steps of the method described above may be executed. Alternatively, in other embodiments, the computing unit 701 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), the Internet and Block-chain network.

The computer system may include a client and a server. The client and server are generally remote from each other and interacting through a communication network. The client-server relation is generated by computer programs running on the respective computers and having a client-server relation with each other. The server may be a cloud server, also known as a cloud computing server or a cloud host, which is a host product in the cloud computing service system to solve the problem that there are the defects of difficult management and weak business expansion in the traditional physical hosts and (Virtual Private Server) VPS services. The server may be a server of a distributed system, or a server combined with a block-chain.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors.

Any modification, equivalent replacement and improvement made within the spirit and principle of the disclosure shall be included in the protection scope of the disclosure.

What is claimed is:

1. A method for reporting asynchronous data, comprising:
   in response to satisfying a data reporting condition, calling a connection opening function for opening a Socket connection of a network resource, and generating a HypertextTransferProtocol (HTTP) request by the connection opening function, wherein the HTTP request at least comprises address information of a server and data to be reported;
   writing the HTTP request into an exclusive resource corresponding to the connection opening function by calling a writing function, and sending the HTTP request to the server by the exclusive resource, wherein an end field is carried in the HTTP request, and in response to the end field being sent, it is determined that sending the HTTP request by the exclusive resource is completed;
   in response to that sending the HTTP request by the exclusive resource is completed, closing the exclusive resource by calling a close function, so as to stop receiving a feedback message of the HTTP request sent by the server and terminate data reporting; and
   in response to that the data reporting is completed, executing the subsequent process directly, so as to not need to wait for the server's feedback on the HTTP request, wherein
   the server stores configuration information, and the configuration information comprises a configuration item configured to instruct the server to continue processing the HTTP request in response to detecting that a client is suspended.

2. The method according to claim 1, wherein
   calling the close function, comprises:
   calling a sleep function to set a sleeping duration, wherein the sleeping duration is less than a transmission duration of the feedback message; and
   in response to reaching the sleeping duration, calling the close function.

3. The method according to claim 1, wherein
   generating the HTTP request by the connection opening function, comprises:
   initializing the HTTP request based on the address information; and
   generating the HTTP request by constructing header information of the initialized HTTP request based on the address information and the data to be reported.

4. The method according to claim 1, wherein
   before calling the connection opening function for opening the Socket connection of the network resource, the method further comprises:
   recording an execution position of a business logic when the data reporting condition is satisfied; and
   in response to that the data reporting is completed, returning to the execution position of the business logic, and continuing executing subsequent process of the business logic.

5. The method according to claim 2, wherein
   before calling the connection opening function for opening the Socket connection of the network resource, the method further comprises:
   recording an execution position of a business logic when the data reporting condition is satisfied; and in response to that the data reporting is completed, returning to the execution position of the business logic, and continuing executing subsequent process of the business logic.

6. The method according to claim 3, wherein before calling the connection opening function for opening the Socket connection of the network resource, the method further comprises:
recording an execution position of a business logic when the data reporting condition is satisfied; and
in response to that the data reporting is completed, returning to the execution position of the business logic, and continuing executing subsequent process of the business logic.

7. The method according to claim 4, wherein satisfying the data reporting condition comprises at least one of the following:
in response to a system time reaching a preset timing reporting time, determining that the data reporting condition is satisfied; and,
detecting a target event during execution of the business logic, and in response to the target event being detected, determining that the data reporting condition is satisfied.

8. An electronic device, comprising:
a processor; and
a memory storing an executable program code; wherein, when the processor runs a program corresponding to the executable program code, the processor is caused to perform a method for reporting asynchronous comprising:
in response to satisfying a data reporting condition, calling a connection opening function for opening a Socket connection of a network resource, and generating a HypertextTransferProtocol (HTTP) request by the connection opening function, wherein the HTTP request at least comprises address information of a server and data to be reported;
writing the HTTP request into an exclusive resource corresponding to the connection opening function by calling a writing function, and sending the HTTP request to the server by the exclusive resource, wherein an end field is carried in the HTTP request, and in response to the end field being sent, it is determined that sending the HTTP request by the exclusive resource is completed;
in response to that sending the HTTP request by the exclusive resource is completed, closing the exclusive resource by calling a close function, so as to stop receiving a feedback message of the HTTP request sent by the server and terminate data reporting; and
in response to that the data reporting is completed, executing the subsequent process directly, so as to not need to wait for the server's feedback on the HTTP request, wherein
the server stores configuration information, and the configuration information comprises a configuration item configured to instruct the server to continue processing the HTTP request in response to detecting that a client is suspended.

9. The device according to claim 8, wherein calling the close function, comprises:
calling a sleep function to set a sleeping duration, wherein
the sleeping duration is less than a transmission duration of the feedback message; and in response to reaching the sleeping duration, calling the close function.

10. The device according to claim 8, wherein generating the HTTP request by the connection opening function, comprises:
initializing the HTTP request based on the address information; and
generating the HTTP request by constructing header information of the initialized HTTP request based on the address information and the data to be reported.

11. The device according to claim 8, wherein before calling the connection opening function for opening the Socket connection of the network resource, the method further comprises:
recording an execution position of a business logic when the data reporting condition is satisfied; and
in response to that the data reporting is completed, returning to the execution position of the business logic, and continuing executing subsequent process of the business logic.

12. The device according to claim 11, wherein satisfying the data reporting condition comprises at least one of the following:
in response to a system time reaching a preset timing reporting time, determining that the data reporting condition is satisfied; and,
detecting a target event during execution of the business logic, and in response to the target event being detected, determining that the data reporting condition is satisfied.

13. A non-transitory computer-readable storage medium having a computer program stored thereon, wherein when the computer program is executed by a processor, the processor is caused to perform a method for reporting asynchronous data comprising:
in response to satisfying a data reporting condition, calling a connection opening function for opening a Socket connection of a network resource, and generating a HypertextTransferProtocol (HTTP) request by the connection opening function, wherein the HTTP request at least comprises address information of a server and data to be reported;
writing the HTTP request into an exclusive resource corresponding to the connection opening function by calling a writing function, and sending the HTTP request to the server by the exclusive resource, wherein an end field is carried in the HTTP request, and in response to the end field being sent, it is determined that sending the HTTP request by the exclusive resource is completed;
in response to that sending the HTTP request by the exclusive resource is completed, closing the exclusive resource by calling a close function, so as to stop receiving a feedback message of the HTTP request sent by the server and terminate data reporting; and
in response to that the data reporting is completed, executing the subsequent process directly, so as to not need to wait for the server's feedback on the HTTP request, wherein
the server stores configuration information, and the configuration information comprises a configuration item configured to instruct the server to continue processing the HTTP request in response to detecting that a client is suspended.

14. The non-transitory computer-readable storage medium according to claim 13, wherein
calling the close function, comprises:
calling a sleep function to set a sleeping duration, wherein the sleeping duration is less than a transmission duration of the feedback message; and
in response to reaching the sleeping duration, calling the close function.

15. The non-transitory computer-readable storage medium according to claim 13, wherein
generating the HTTP request by the connection opening function, comprises:
initializing the HTTP request based on the address information; and
generating the HTTP request by constructing header information of the initialized HTTP request based on the address information and the data to be reported.

16. The non-transitory computer-readable storage medium according to claim 13, wherein before calling the connection opening function for opening the Socket connection of the network resource, the method further comprises:
recording an execution position of a business logic when the data reporting condition is satisfied; and
in response to that the data reporting is completed, returning to the execution position of the business logic, and continuing executing subsequent process of the business logic.

17. The non-transitory computer-readable storage medium according to claim 16, wherein
satisfying the data reporting condition comprises at least one of the following:
in response to a system time reaching a preset timing reporting time, determining that the data reporting condition is satisfied; and,
detecting a target event during execution of the business logic, and in response to the target event being detected, determining that the data reporting condition is satisfied.

* * * * *